United States Patent [19]
Armstrong

[11] 3,805,935
[45] Apr. 23, 1974

[54] IMPINGEMENT COOLING MEANS FOR FRICTION CLUTCH OR DISC BRAKE

[75] Inventor: Jack W. Armstrong, Baldwinsville, N.Y.

[73] Assignee: Lipe-Rollway Corporation, Syracuse, N.Y.

[22] Filed: June 27, 1972

[21] Appl. No.: 266,625

[52] U.S. Cl. .................... 192/113 A, 188/218 XL
[51] Int. Cl. ............................................. F16d 13/72
[58] Field of Search .................. 192/113 A, 113 B

[56] References Cited
UNITED STATES PATENTS
2,885,047  5/1959  Kehrl ........................... 192/113 A X
1,808,511  6/1931  Robbins ....................... 192/113 A X
1,635,353  7/1927  Alley ............................ 192/113 A
FOREIGN PATENTS OR APPLICATIONS
1,113,195  11/1955  France ......................... 192/113 A Primary Examiner—Benjamin W. Wyche
Attorney, Agent, or Firm—Bruns & Jenney

[57] ABSTRACT

Cooling means for a friction clutch or disc brake wherein superior cooling is achieved by impinging high velocity jets of relatively cool air against the frictionally engageable surfaces of the clutch or brake. Fluid passages are provided in one or more of the engagement members and these communicate with jet orifices which direct air introduced into the passages under pressure against the friction surfaces of the adjacent members. The orifices are arranged so that the air jets are substantially perpendicular to the adjacent friction surfaces and cool the latter far more effectively than can be accomplished by means of laminar flowing cooling air.

2 Claims, 4 Drawing Figures

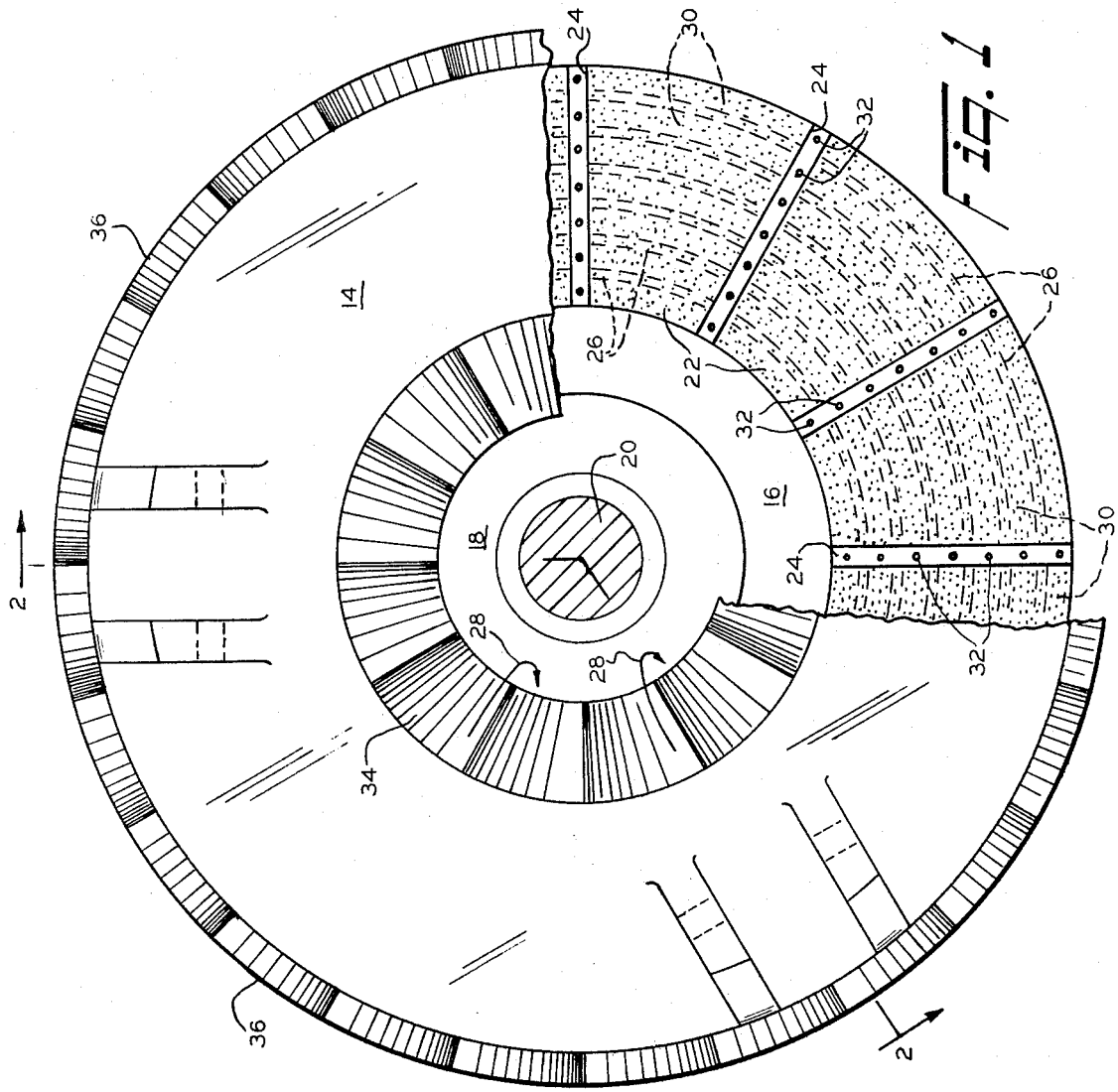
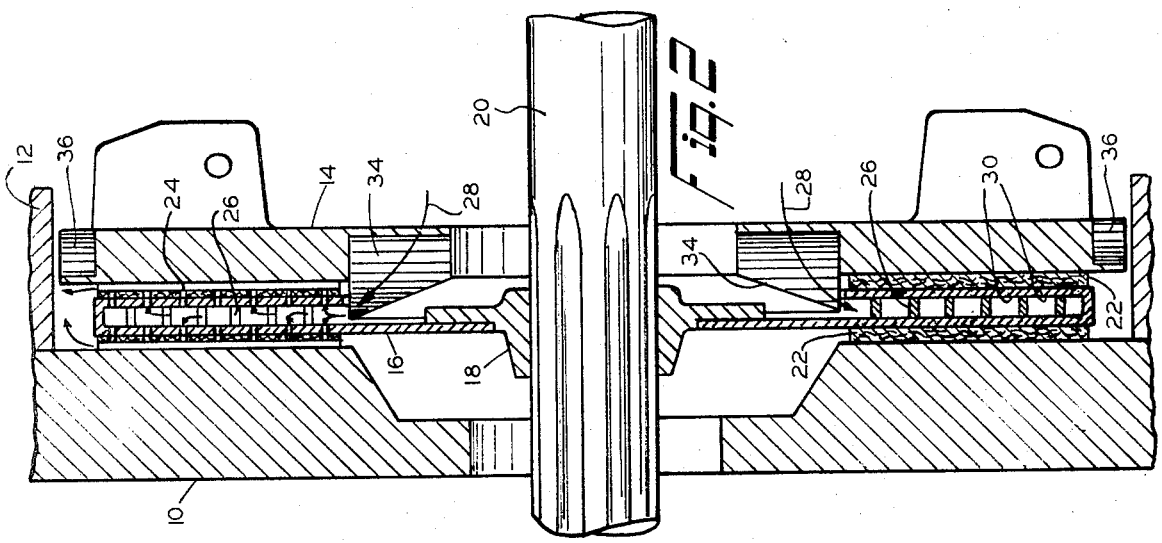

IMPINGEMENT COOLING MEANS FOR FRICTION CLUTCH OR DISC BRAKE

BACKGROUND OF THE INVENTION

This invention relates generally to friction clutches and the like, and has particular reference to an improved means for cooling the frictional surfaces of such clutches utilizing jet impingement of the cooling fluid.

As is well known in the art, very high temperatures are developed in frictional clutches, disc brakes and the like and the excessive heat creates many problems which shorten the life of the equipment. Conventionally, clutches are cooled by oil in the housing or by ambient air. Cooling by oil is, of course, more expensive than cooling by air and has the further disadvantages of drag and the possibility of deterioration. With ambient air within the clutch housing, on the other hand, the air itself is at a relatively high temperature so that the cooling is inefficient.

When air cooling is employed, it has been found that the air molecules directly adjacent the clutch plates cohere to the metal surfaces and form a film that remains static even under laminar air flow conditions, i.e., when the cooling air is flowing in layers parallel to plate surfaces. There are therefore billions of very hot air molecules which are not forced out of the valleys in the metal by the laminar flowing air and this static film acts as an insulator preventing the escape of heat within the plates.

SUMMARY OF THE INVENTION

In the present invention, it is contemplated that clutches and disc brakes will be cooled by air but that the air will be highly turbulent so as to achieve maximum contact between the air and the surfaces to be cooled and thus the most effective cooling possible. Specifically, the invention is directed to a clutch or brake cooling means wherein one or more of the engagement discs or plates is formed with interior fluid passages into which air under pressure is introduced by fan or turbine type means forming a part of the clutch. The pressurized air escapes from the passages through orifices in the sides of the plate which orifices are dimensioned and arranged so that high velocity air jets are directed substantially perpendicularly towards the adjacent surfaces to be cooled. The air jets impinge upon these surfaces with sufficient force to break up any static films of hot air molecules and dislodge the molecules from the valleys in the metal. The dislodged molecules are replaced by cooler molecules that take heat from the member being cooled and in turn are dislodged and replaced. In this manner very effective cooling occurs.

The jet impingement cooling of the invention has the important advantages of being substantially more effective than cooling by laminar flowing air and at least as effective but cheaper than cooling by oil. Additionally, since the friction facings of the clutch or brake do not get hot enough to burn off, adjustments and replacements are greatly reduced. Release lever linkages and bearings are also kept cooler and therefore wear less and last longer. The useful life of bearings and other parts requiring lubrication is also prolonged by the fact that the lubricants do not get so hot that they polymerize which has been a problem with conventional air cooling.

Another advantage of the cooling means of the invention is that more uniform torque is obtained. Thus, with friction facing wear reduced to a minimum, pressure plate springs do not extend and lose their pressure, and thus the torque remains substantially constant. A most important advantage of the invention is that by keeping clutches cooler during operation, the possibility of clutch burst within the range of possible engine speeds is materially reduced.

BRIEF DESCRIPTION OF THE DRAWINGS

FIG. 1 is an elevational view, with a portion broken away, of a clutch provided with cooling means embodying the invention;

FIG. 2 is a sectional view taken substantially on line 2—2 of FIG. 1;

DESCRIPTION OF THE PREFERRED EMBODIMENTS

Figure 3:
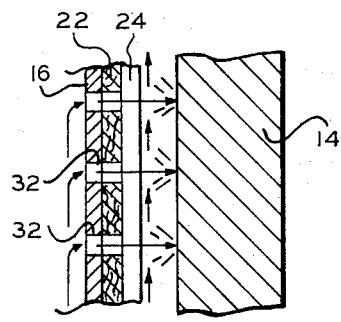
FIG. 3 is an enlarged and exaggerated illustration of a small portion of FIG. 2 showing the jet impingement action of the cooling fluid.

The friction clutch of FIGS. 1 and 2 is for simplicity illustrated in a somewhat stylized manner with a number of conventional parts omitted. The clutch includes a flywheel 10, flywheel ring 12, pressure plate 14 and friction disc 16, see FIG. 2. Disc 16 is provided with a hub 18 that is mounted for limited lateral movement on driven shaft 20, the hub and shaft having conventional splined interengagement.

As is well understood, the flywheel 10, ring 12 and pressure plate 14 rotate whenever the engine is operating. When the clutch is engaged, the pressure plate is spring biased into engagement with the disc 16 forcing it into engagement with the flywheel whereby the disc also rotates and drives shaft 20 which is geared to the transmission.

Secured to each side of friction disc 16 are annular friction facings 22 of conventional composition, the outer surfaces of the facings having radial grooves 24 as best shown in FIG. 1. The disc facings engage the confronting flat surfaces of the metal flywheel and pressure plate when the clutch is engaged, and it is in these areas that the greatest heat is developed during operation.

In accord with the invention, means are provided to draw cooling air into the disc 16 and discharge it through the friction facings 22 in such a manner that air jets impinge upon the confronting flywheel and pressure plate surfaces to cool them. To this end, the outer annular portion of disc 16 is formed with spaced walls to provide fluid passages therein, and a plurality of concentric, arcuate ribs or spacers 26 are mounted between the walls as indicated in FIGS. 1 and 2 to keep them from buckling under the pressure exerted by the pressure plate.

In the area of each friction facing groove 24, the spacers 26 are interrupted so that cooling air entering disc 16 at the inner diameter of the annular spaced wall portion thereof (as indicated by arrows 28) can move radially outwardly as well as circulate in the arcuate passages 30 between the spacers 26. At each facing groove 24 jet orifices 32 are drilled through the remaining facing material and disc walls so that the orifices communicate with the interior fluid passages as best shown in FIGS. 2 and 3. If required, additional orifices can, of course, be provided in the areas between the grooves 24.

Air is forced into the disc passageways by means of fan or turbine type blades 34 formed on the pressure plate adjacent its inner diameter. Other blades 36 adjacent the outer diameter of the pressure plate aid in discharging the air after it has performed its cooling function. With this arrangement, air under pressure enters the disc passageways and emerges therefrom through the orifices 32 as a multiplicity of high velocity jets.

As shown in FIG. 2 and in an exaggerated manner in FIG. 3, the emerging air jets are substantially perpendicular to the confronting flywheel and pressure plate surfaces and impinge upon them with considerable force. This, as noted hereinabove, breaks up any static film of hot air molecules there might be on the metal surfaces and also dislodges such molecules from valleys in the metal. As a result, far more effective cooling is achieved than is possible with laminar flowing cooling air, i.e., where the air flow is parallel to the disc, flywheel and pressure plate engaging surfaces.

Figure 4:
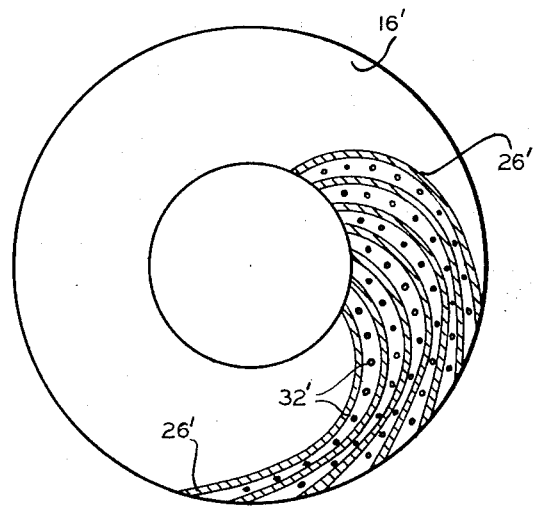
FIG. 4 is a section through a modified form of frictional disc.

FIG. 4 is a section through a modified form of friction disc 16'. In this construction, the disc walls are maintained in spaced, parallel relation by spacers 26' of generally helical configuration as shown and the jet orifices 32' are arranged in the same configuration between the spacers.

While the invention has been described with particular reference to a friction clutch, it will be apparent to those familiar with the art that it is equally applicable to a disc brake or similar device. Moreover, it will be understood that the invention may be embodied in other specific forms without departing from the spirit or essential characteristics thereof.

I claim:

1. In a friction clutch including a flywheel, a friction disc and a pressure plate operable to engage the disc and move it into engagement with the flywheel: fluid cooling means for the engaging surfaces of the flywheel, disc and plate including fluid passage means in the interior of the disc, jet orifices in the disc extending from the passage means to the exterior surfaces of the disc and arranged to direct fluid to exit from the passage means substantially perpendicular to the disc engaging surfaces of the flywheel and pressure plate, the jet orifices being the only exits provided for fluid entering the passage means, and means in the clutch to force ambient fluid to flow under pressure into the disc passage means and out through the jet orifices whereby fluid jets impinge upon the disc engaging surfaces of the flywheel and pressure plate to cool same.

2. Clutch cooling means as defined in claim 1 wherein said means to force fluid into the disc passage means comprises blades at the inner diameter of the pressure plate adjacent the entrance to the passage means.

* * * * *